United States Patent
Zhang et al.

(10) Patent No.: US 9,504,117 B2
(45) Date of Patent: Nov. 22, 2016

(54) OVER-VOLTAGE AND OVER-CURRENT PROTECTION CIRCUITS AND ELECTRONIC DEVICES

(71) Applicant: SHENZHEN CHINA STAR OPTOELECTRONICS TECHNOLOGY CO., LTD., Shenzhen, Guangdong (CN)

(72) Inventors: Hua Zhang, Guangdong (CN); Xianming Zhang, Guangdong (CN)

( * ) Notice: Subject to any disclaimer, the term of this patent is extended or adjusted under 35 U.S.C. 154(b) by 0 days.

(21) Appl. No.: 14/647,110

(22) PCT Filed: Dec. 16, 2014

(86) PCT No.: PCT/CN2014/093960
§ 371 (c)(1),
(2) Date: May 25, 2015

(87) PCT Pub. No.: WO2015/090186
PCT Pub. Date: Jun. 25, 2015

(65) Prior Publication Data
US 2016/0286620 A1 Sep. 29, 2016

(30) Foreign Application Priority Data

Dec. 17, 2013 (CN) .......................... 2013 1 0695497

(51) Int. Cl.
*H05B 37/00* (2006.01)
*H05B 33/08* (2006.01)

(52) U.S. Cl.
CPC ........ *H05B 33/0884* (2013.01); *H05B 33/089* (2013.01); *H05B 33/0815* (2013.01); *H05B 33/0827* (2013.01); *H05B 33/0842* (2013.01)

(58) Field of Classification Search
CPC .............. H02M 2001/0012; H02M 2001/009; H02M 2003/1555; H02M 3/156; H02M 3/157; H02M 3/1588; H02M 3/33507; H02M 3/3372; H02M 3/15; H02J 2007/0037; H02J 2007/0039; H02J 7/0026; H02J 7/0029
See application file for complete search history.

(56) References Cited

U.S. PATENT DOCUMENTS

2012/0056544 A1 3/2012 Jeong et al.
2012/0126713 A1 5/2012 Horino

FOREIGN PATENT DOCUMENTS

CN 1815838 A 8/2006
CN 101711069 A 5/2010
(Continued)

OTHER PUBLICATIONS

Shan Tian, the International Searching Authority written comments, Mar. 2015, CN.
(Continued)

*Primary Examiner* — Douglas W Owens
*Assistant Examiner* — Monica C King

(57) ABSTRACT

The present invention provides an over-voltage and over-current protection circuit (30), including an over-voltage detection unit (31) to generate an over-voltage detection voltage, an over-current detection unit (32) to generate an over-current detection voltage, a LED driving unit (33) being connected with the over-voltage detection unit and the over-current detection unit to converter a reference voltage into an over-voltage reference voltage and an over-current reference voltage being proportional to the reference voltage, a reference voltage adjusting unit (34) and a control unit (35). The control unit (35) outputs a boost control signal with a high level when it judges that change range of the working voltage of the LED module (20) exceeds a predetermined value according to a LED characteristic data curve. The present invention provides an electronic device (1), the over-voltage or over-current protection threshold could be increased along with increasing the working time of the electronic device (1).

15 Claims, 2 Drawing Sheets

(56) References Cited

FOREIGN PATENT DOCUMENTS

| CN | 102123555 A | 7/2011 |
|---|---|---|
| CN | 102143639 A | 8/2011 |
| CN | 102268642 A | 12/2011 |
| CN | 102300354 A | 12/2011 |
| CN | 202246836 U | 5/2012 |
| CN | 202336310 U | 7/2012 |
| CN | 102794432 A | 11/2012 |
| CN | 102861524 A | 1/2013 |
| CN | 103165085 A | 6/2013 |
| CN | 103687240 A | 3/2014 |
| JP | H05295461 A | 11/1993 |
| JP | 2011-233450 A | 11/2011 |
| TW | 200423809 A | 11/2004 |
| TW | 201247535 A1 | 12/2012 |

OTHER PUBLICATIONS

Aohan Wang, the International Searching Authority written comments, Oct. 2014, CN.

OVER-VOLTAGE AND OVER-CURRENT PROTECTION CIRCUITS AND ELECTRONIC DEVICES

FIELD OF THE INVENTION

The present invention relates to a protection circuit, and more particularly to an over-voltage and over-current protection circuit and an electronic device having such over-voltage and over-current protection circuit.

BACKGROUND OF THE INVENTION

Currently, LED (light-emitting diode) is increasingly used as a backlight module for electronic devices such as TV and computer screens. En general, characteristics of LED would change after a longtime working of the electronic device, that is, required voltage to light the LED would slowly increase according a curve with time, so the output voltage of the LED light backlight driver circuit would gradually rise. At present, values of OVP (Output Over-voltage Protection), OCP (Input Over-current Protection) are all set in advance, and it is difficult to change, thus the OVP and OCP values should be relatively low when the output voltage of the LED light backlight driver circuit gradually rise, which results the protection function be triggered abnormally but the LED works properly.

SUMMARY OF THE INVENTION

The present invention provides an over-voltage and over-current protection circuit and an electronic device, wherein an over-voltage and over-current protection triggering threshold could be increased with increasing working hours of the the electronic device.

An over-voltage and over-current protection circuit is used for a LED module of an electronic device which is supplied by a power source, wherein the LED module comprises a positive input and the power source comprises an output. The over-voltage and over-current protection circuit comprises an over-voltage detection unit being connected between the positive input and ground to detect the voltage of the positive input of the LED module to generate an over-voltage detection voltage being proportional to the positive input voltage V, an over-current detection unit being connected between the output of the power source and the ground to detect the current of the LED module to generate an over-current detection voltage being proportional to the positive input current, a LED driving unit being connected with the over-voltage detection unit and the over-current detection unit to converter a reference voltage into an over-voltage reference voltage and an over-current reference voltage being proportional to the reference voltage, the LED driving unit compares respectively the over-voltage reference voltage and the over-current reference voltage to the over-voltage detection voltage to decide whether to perform an over-current or over-voltage protection, a reference voltage adjusting unit outputting the reference voltage to the LED driving unit, and a control unit storing LED characteristic data curve reflecting a changing relationship between the working voltage of the LED module and the time, the reference voltage adjusting unit increases the reference voltage output when the control unit judges that change range of the working voltage of the LED module exceeds a predetermined value according to the LED characteristic data curve.

Wherein, the LED driving unit comprises an over-voltage detecting end, a over-current detecting end and a reference voltage input end. The over-voltage detecting end obtains the over-voltage detecting voltage, the over-current detecting end obtains the over-current detecting voltage, and the reference voltage input end receives the reference voltage. The reference voltage adjusting unit comprises a voltage input end, a voltage output end and a controlled end. The voltage input end is connected to a voltage terminal, the voltage output end is connected to the reference voltage input end of the LED driving unit to output the reference voltage to the reference voltage input end of the LED driving unit. The control unit comprises a control end being connected to the controlled end of the reference voltage adjusting unit.

Wherein, the control unit obtains an initial value of the working voltage in the LED characteristic data curve in the beginning and a voltage corresponding to time in the LED characteristic data curve according to working time of the LED module, if change range of the voltage corresponding to the current time relating to the initial value of the working voltage is greater than a predetermined value, the control unit outputs via the control output end a boost control signal to the controlled end of the reference voltage adjusting unit and controls the reference voltage adjusting unit increasing the reference voltage output at the voltage output end.

Wherein, the over-voltage detection unit comprises a first resistor and a second resistor being connected in series between the positive input end of the LED module and the grand, voltage of a connecting node of the first resistor and the second resistor is the over-voltage detection voltage, which is obtained by connecting the over-voltage detecting end to the connecting node, the over-current detection unit comprises a third resistor being electrically connected between the output end of the power source and the grand, the voltage of a far end of the third resistor is the over-current detection voltage, which is proportional to the current of the third resistor.

Wherein, the reference voltage adjusting unit comprises a first NMOS transistor, a second NMOS transistor and a fourth resistor, a fifth resistor, a sixth resistor and a seventh resistor; the fourth resistor and the fifth resistor are connected in series between the voltage input end and the grand, a connecting node of the fourth resistor and the fifth resistor forms the voltage output end; a source of the first NMOS transistor is connected to the grand via the sixth resistor, and a drain is connected with the fourth resistor and the fifth resistor; a gate of the second NMOS transistor forms the controlled end, a source of the second NMOS transistor is connected to the grand, and its drain is connected to the gate of the first NMOS transistor and the voltage input end via the seventh resistor.

Wherein, the LED module further comprises a LED string being connected in parallel between the positive input end and the grand, and each LED string comprises a plurality of LED lights being connected in series with the positive input end and the grand.

Wherein, the LED characteristic data curve is previously obtained according to the characteristics of the LED string of the LED module.

A electronic device comprises a power source, a LED module and a over-voltage and over-current protection circuit, the power source supplying the LED module, and the LED module comprises a positive end, the power source comprises a output end, wherein the over-voltage and over-current protection circuit comprises an over-voltage detection unit being connected between the positive input and ground to detect the voltage of the positive input of the LED module to generate an over-voltage detection voltage being proportional to the positive input voltage; an over-current detection unit being connected between the output of the power source and the ground to detect the current of the LED module to generate an over-current detection voltage being proportional to the positive input current; a LED driving unit being connected with the over-voltage detection unit and the over-current detection unit to converter a reference voltage into an over-voltage reference voltage and an over-current reference voltage being proportional to the reference voltage, the LED driving unit comparing respectively the over-voltage reference voltage and the over-current reference voltage to the over-voltage detection voltage to decide whether to perform an over-current or over-voltage protection; a reference voltage adjusting unit outputting the reference voltage to the LED driving unit; and a control unit storing LED characteristic data curve reflecting a changing relationship between the working voltage of the LED module and the time, the reference voltage adjusting unit increasing the outputting reference voltage when the control unit judges that change range of the working voltage of the LED module exceeding a predetermined value according to the LED characteristic data curve.

Wherein, the LED driving unit comprises an over-voltage detecting end, a over-current detecting end and a reference voltage input end, the over-voltage detecting end obtains the over-voltage detecting voltage, the over-current detecting end obtains the over-current detecting voltage, and the reference voltage input end receives the reference voltage, the reference voltage adjusting unit comprises a voltage input end, a voltage output end and a controlled end, the voltage input end is connected to a voltage terminal, the voltage output end is connected to the reference voltage input end of the LED driving unit to output the reference voltage to the reference voltage input end of the LED driving unit, the control unit comprises a control end being connected to the controlled end of the reference voltage adjusting unit.

Wherein, the control unit obtains an initial value of the working voltage in the LED characteristic data curve in the beginning and a voltage corresponding to time in the LED characteristic data curve according to working time of the LED module, if change range of the voltage corresponding to the current time relating to the initial value of the working voltage is greater than a predetermined value, the control unit outputs via the control output end a boost control signal to the controlled end of the reference voltage adjusting unit and controls the reference voltage adjusting unit increasing the reference voltage output at the voltage output end.

Wherein, the over-voltage detection unit comprises a first resistor and a second resistor being connected in series between the positive input end of the LED module and the grand, voltage of a connecting node of the first resistor and the second resistor is the over-voltage detection voltage, which is obtained by connecting the over-voltage detecting end to the connecting node; the over-current detection unit comprises a third resistor being electrically connected between the output end of the power source and the grand, the voltage of a far end of the third resistor is the over-current detection voltage, which is proportional to the current of the third resistor.

Wherein, the reference voltage adjusting unit comprises a first NMOS transistor, a second NMOS transistor and a fourth resistor, a fifth resistor, a sixth resistor and a seventh resistor; the fourth resistor and the fifth resistor are connected in series between the voltage input end and the grand, a connecting node of the fourth resistor and the fifth resistor forms the voltage output end; a source of the first NMOS transistor is connected to the grand via the sixth resistor, and a drain is connected with the fourth resistor and the fifth resistor; a gate of the second NMOS transistor forms the controlled end, a source of the second NMOS transistor is connected to the grand, and its drain is connected to the gate of the first NMOS transistor and the voltage input end via the seventh resistor.

Wherein, the LED module further comprises a LED string being connected in parallel between the positive input end and the grand, and each LED string comprises a plurality of LED lights being connected in series with the positive input end and the grand.

Wherein, the LED characteristic data curve is previously obtained according to the characteristics of the LED string of the LED module.

Wherein, the electronic device is selected among LCD TVs, monitors, mobile phones, tablet PCs and laptops.

By the over-voltage and over-current protection circuit and the electronic device of the present invention, the over-voltage and over-current protection triggering threshold could be increased with increasing working hours of the the electronic device, thus to avoid the protection function be triggered abnormally but the LED works properly.

DETAILED DESCRIPTION OF THE PREFERRED EMBODIMENTS

Figure 1:
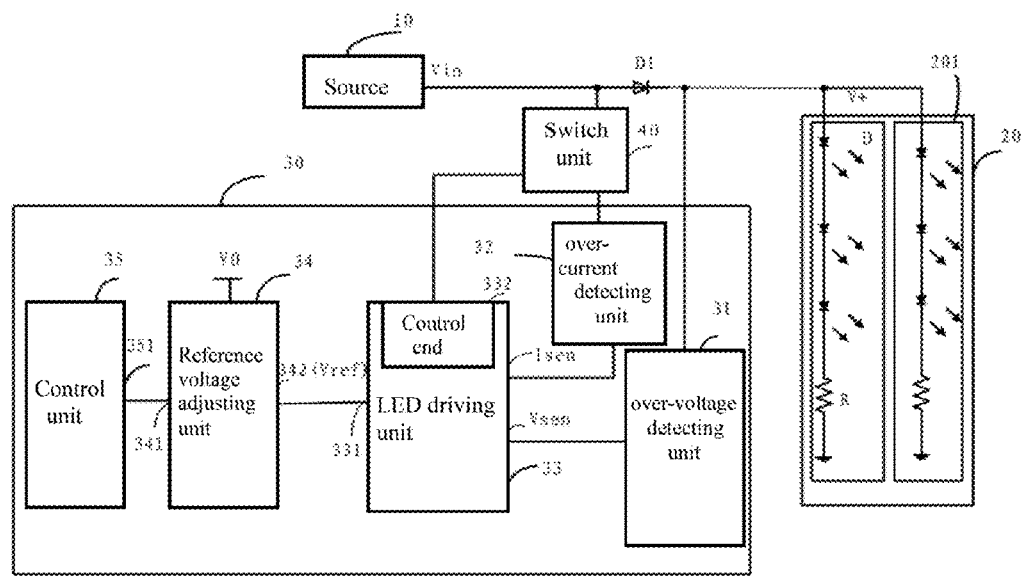
FIG. 1 is a module architecture diagram of the electronic device having an over-voltage and over-current protection circuit according to an embodiment of the invention.

Please refer to FIG. 1, which shows a module architecture diagram of the electronic device 100 having an over-voltage and over-current protection circuit 1 according to an embodiment of the invention. The electronic device 100 includes a power source 10, a LED module 20 and an over-voltage and over-current protection circuit 30.

The LED module 20 includes a positive input end V+ and a LED string 201 being connected in parallel between the positive input end V+ and a grand, each LED string 201 includes a plurality of LED lights D being connected in series with the positive input end V+ and the grand.

The power source 10 includes an output end Vin which is connected to the positive input end V+ of the LED module 20. The power source 10 supplies the LED module 20 and a control unit 31. Wherein the power source 10 could be batteries or a power adapter, etc.

The over-voltage and over-current protection circuit 30 includes an over-voltage detection unit 31, an over-current detection unit 32, a LED driving unit 33, a reference voltage adjusting unit 34 and a control unit 35.

The over-voltage detection unit 31 is connected between the positive input end V+ and ground to detect the voltage of the positive input end V+ of the LED module 20 to generate an over-voltage detection voltage being proportional to the positive input voltage.

The over-current detection unit 32 is connected between the output end Vin of the power source 10 and the ground to detect input current of the LED module 20 to generate an over-current detection voltage being proportional to the positive input current.

A LED driving unit 33 is connected with the over-voltage detection unit 31 and the over-current detection unit 33 to converter a reference voltage Vref into an over-voltage reference voltage and an over-current reference voltage being proportional to the reference voltage. the LED driving unit 33 compares respectively the over-voltage reference voltage and the over-current reference voltage to the over-voltage detection voltage to decide whether to perform an over-current or over-voltage protection.

The reference voltage adjusting unit 34 outputs the reference voltage Vref to the LED driving unit 33.

Figure 2:
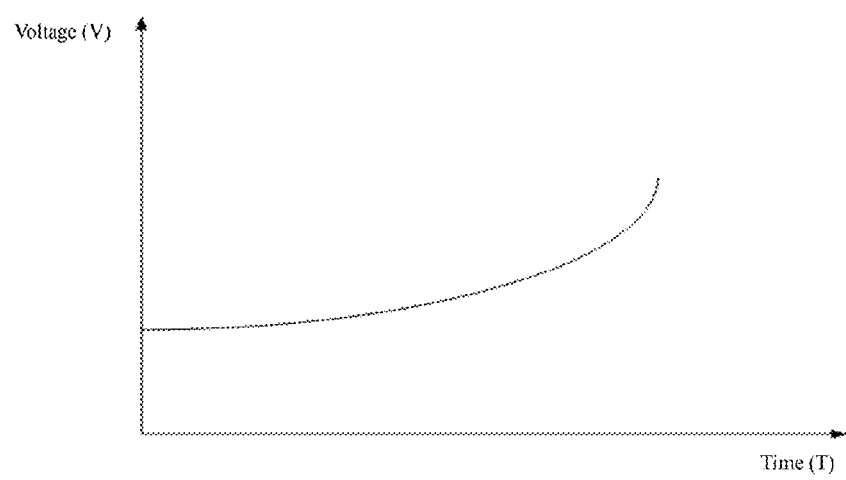
FIG. 2 is a schematic diagram of a LED characteristic data curve according to an embodiment of the invention.

Please refer in conjunction to FIG. 2, a control unit 35 stores LED characteristic data curve LD reflecting a changing relationship between the working voltage of the LED module 20 and the time, the control unit 35 increases the outputting reference voltage Vref by judging if the change range of the working voltage of the LED module 20 exceeds a predetermined value according to the LED characteristic data curve. Wherein, the LED characteristic data curve LD is obtained according to the characteristics of the LED string 201 of the LED module 20, that is, according to the changed relationship between the working voltage of the LED string 201 of the LED module 20 and time, and is stored in the control unit 35 by burning, etc.

Specifically, the LED driving unit 35 includes an over-voltage detecting end Vsen, an over-current detecting end Isen and a reference voltage input end 331. The over-voltage detecting end Vsen obtains the over-voltage detecting voltage, the over-current detecting end Isen obtains the over-current detecting voltage, and the reference voltage input end 331 receives the reference voltage Vref. The LED driving unit 33 converters a reference voltage received by the reference voltage input end 331 into an over-voltage reference voltage and an over-current reference voltage being proportional to the reference voltage Vref. The LED driving unit 33 compares respectively the over-voltage reference voltage and the over-current reference voltage to the over-voltage detection voltage to decide whether to perform an over-current or over-voltage protection. And more specifically, the LED driving unit 33 executes over-voltage protection if the over-voltage detection voltage is greater the over-voltage reference voltage, and executes over-current protection if the over-current detection voltage is greater the over-current reference voltage.

The reference voltage adjusting unit 34 includes a voltage input end 341, a voltage output end 342 and a controlled end 343. The voltage input end 341 is connected to a voltage terminal V0, the voltage output end 342 is connected to the reference voltage input end 331 of the LED driving unit 33 to output the reference voltage Vref to the reference voltage input end 331 of the LED driving unit 33.

The control unit 35 includes a control end 351 being connected to the controlled end 343 of the reference voltage adjusting unit 34. The control unit 35 outputs via the control output end 351 a boost control signal to the controlled end 343 of the reference voltage adjusting unit 34 by judging change range of the working voltage of the LED module 20 exceeding a predetermined value according to the LED characteristic data curve LD. The reference voltage adjusting unit 34 increases the reference voltage Vref output at the voltage output end 342 when receiving the boost control signal at the voltage output end 342. Thus, the over-voltage reference voltage and the over-current reference voltage would also increase accordingly, which increases the over-current and over-voltage protection threshold value. Therefore, the over-voltage and over-current protection function could not be triggered abnormally when the working voltage of the LED module 20 normally increased.

Wherein, the control unit 35 obtains an initial value of the working voltage in the LED characteristic data curve LD when the LED module 20 begins working and a voltage corresponding to time in the LED characteristic data curve LD according to working time of the LED module 20. If change range of the voltage corresponding to the current time relating to the initial value of the working voltage is greater than a predetermined value, the control unit 35 outputs via the control output end 351 a boost control signal to the controlled end 343 of the reference voltage adjusting unit 34.

Wherein, the electronic device 100 further includes a switch unit 40 and a diode D1. The switch unit 40 is connected between the output end Vin of the power source 10 and the over-current detection unit 32. The LED driving unit further includes a control end 332 being connected to the switch unit 40. The LED driving unit outputs PWM (Pulse-Width Modulation) signals via the control end 332 to the switch unit 40 to control it alternately turn on/off, thus to convert the output voltage of the output end Vin of the power source 10 into a switching power supply voltage to supply the LED module 20.

An anode of the diode D1 is connected to the switch unit 40 and the output end Vin of the power source 10, and its cathode is connected to the positive input end V+ of the LED module 20. The diode D1 unidirectionally conducts the output voltage from the the output end Vin of the power source 10 to the LED module 20, thus to avoid a reverse Voltage.

Wherein, the LED driving unit 33 could be a LED constant current driver chip, a voltage end V0 thereof is connected to the power source 10 and supplied with a high level.

Figure 3:
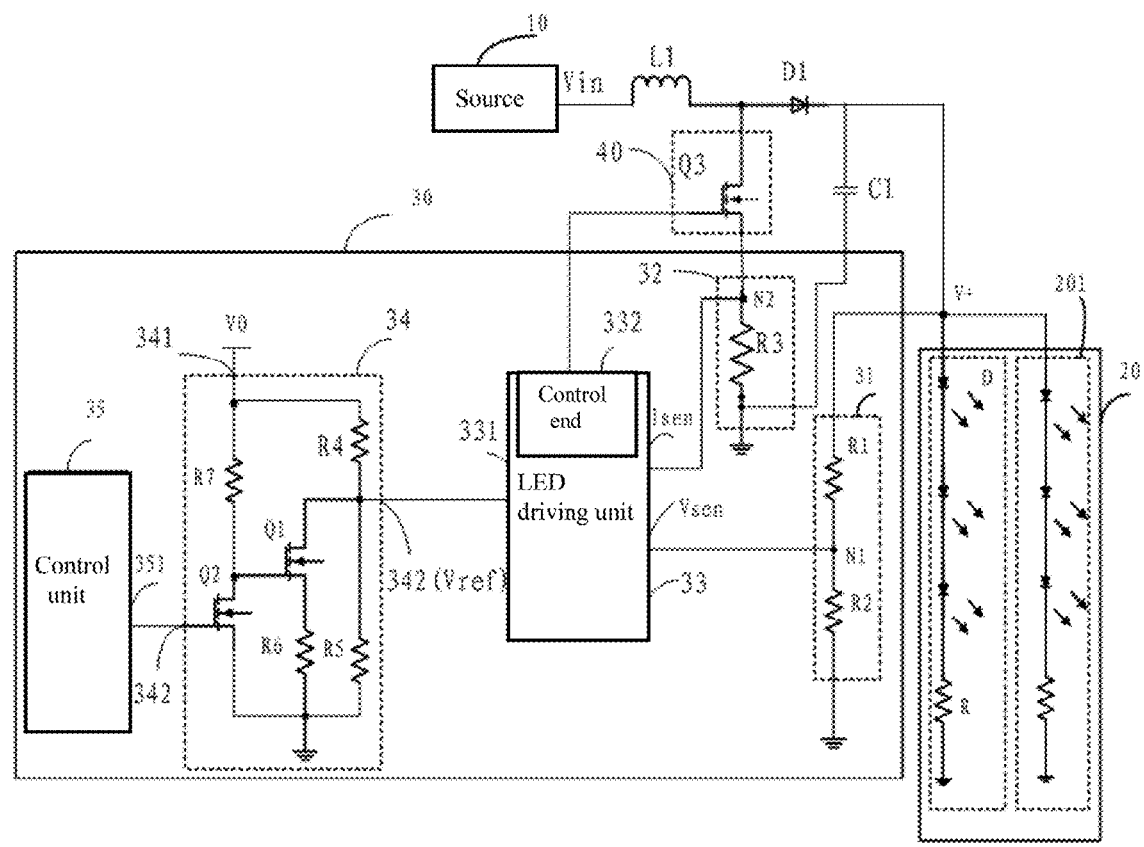
FIG. 3 is a specific circuit diagram of the electronic device having an over-voltage and over-current protection circuit according to an embodiment of the invention.

Please refer to FIG. 3, specifically, the over-voltage detection unit 31 includes resistors R1, R2 being connected in series between the positive input end V+ of the LED module 20 and the grand. The voltage of a connecting node of the resistor R1, R2 is the over-voltage detection voltage, which is obtained by connecting the over-voltage detecting end Vsen of the LED driving unit 33 to the connecting node. Obviously, the over-voltage detecting voltage is proportional to that of the positive input end V+ of the LED module 20.

The over-current detection unit 32 includes a resistor R3 being electrically connected between the output end Vin of the power source 10 and the grand. The voltage of a far end N2 of the resistor R3 is the over-current detection voltage, which is proportional to the current of the resistor R3.

The reference voltage adjusting unit 34 includes a NMOS transistor Q1, a NMOS transistor Q2 and a resistor R4, R5, R6, R7; the resistors R4 and R5 are connected in series between the voltage input end 342 and the grand. A connecting node of the resistors R4 and R5 forms the voltage output end 342. A source of the NMOS transistor Q1 is connected to the grand via the resistor R6, and a drain is connected with the node of the resistors R4 and R5, that is the voltage output end 342. Therefore, the NMOS transistor Q1 is connected in series to the resistor R6 and then in parallel to the resistor R5 between the voltage input end 342 and the grand. A gate of the NMOS transistor Q2 forms the controlled end 343, a source of the NMOS transistor Q2 is connected to the grand, and its drain is connected to the gate of the NMOS transistor Q1 and the voltage input end 341 via the resistor R7.

In the present embodiment, the boost control signal is a high-level signal.

When the LED module 20 begins working and the control unit 35 doesn't output the high level boost control signal, the NMOS transistor Q2 is turned off, the gate of the NMOS transistor Q1 obtains a high level voltage by electronically connecting the resistor R7 with the voltage end V0, thus to turn on the NMOS transistor Q1. Therefore, the resistor R6 is connected in parallel to the resistor R5 and then connected in series to the resistor R4 between the voltage input end 341 and grand. In this case, the reference voltage Vref=V0*(R5//R6)/(R4+R5//R6).

Consequently, the control unit 35 outputs a boost control signal with a high level via the control end 351 when it judges that change range of the working voltage of the LED module 20 exceeds a predetermined value according to the LED characteristic data curve LD. The gate of the NMOS transistor Q2 receives the boost control signal with a high level to turn on the NMOS transistor Q2, so the drain of the NMOS transistor Q1 is at a low level by the conducting NMOS transistor Q2 is connected to the grand, the NMOS transistor Q1 is cut-off accordingly, and the circuit including the resistor R6 is cut-off. In this case, the reference voltage Vref=V0*R5/(R4+R5). Apparently, the resistance value of the resistor R5 is greater than that of connecting in parallel of the resistors R5 and R6, so the reference voltage in this moment is greater than that when the LED module 20 begins working. Namely, if the reference voltage Vref increases, the over-voltage reference voltage and the over-current reference voltage also increase accordingly, so, the over-voltage or over-current protection threshold could increase along with increasing the working voltage of the LED module 20, thus to avoid the over-voltage or over-current protection be triggered abnormally.

Wherein, the switch unit 40 is a NMOS transistor Q3, a gate of which is connected to the control end 332 of the LED driving unit 33, its source is connected to the far end 332 of the resistor R3, and a drain is connected to the output end Vin of the power source 10. The LED driving unit 33 outputs PWM signals via the control end 332 to the NMOS transistor Q3 to control it alternately turn on/off, thus to convert the output voltage of the output end Vin of the power source 10 into a switching power supply voltage to supply the LED module 20.

The diode D1 id forward biased between the drain of the NMOS transistor Q3 and the positive voltage end V+. Wherein, each LED string 201 of the LED module 20 further includes a resistor R being connected in series between the LED light D and the grand.

Wherein, the NMOS transistors Q1, Q2, Q3 could be NPN transistors, PMOS transistors, or PNP transistors. The electronic device 100 could be LCD TVs, monitors, mobile phones, tablet PCs, and notebook computers.

Wherein, the electronic device 100 further includes an inductor L1 and a capacitor C1, it should not be repeated here because they are not relating to the improvement of the present invention.

Which is disclosed above is only a preferred embodiment of the present invention and certainly not in order to limit the scope of the invention, therefore, equivalent variations according to the claims of the present invention will be still covered by the scope of the present invention.

What is claimed is:

1. An over-voltage and over-current protection circuit being used for a LED module of an electronic device which being supplied by a power source, the LED module comprising a positive input and the power source comprising an output, wherein the over-voltage and over-current protection circuit comprise:

an over-voltage detection unit being connected between the positive input end and ground to detect the voltage of the positive input of the LED module to generate an over-voltage detection voltage being proportional to the positive input voltage;

an over-current detection unit being connected between the output end of the power source and the ground to detect the current of the LED module to generate an over-current detection voltage being proportional to the positive input current;

a LED driving unit being connected with the over-voltage detection unit and the over-current detection unit to converter a reference voltage into an over-voltage reference voltage and an over-current reference voltage being proportional to the reference voltage, the LED driving unit comparing respectively the over-voltage reference voltage and the over-current reference voltage to the over-voltage detection voltage to decide whether to perform an over-current or over-voltage protection;

a reference voltage adjusting unit outputting the reference voltage to the LED driving unit; and a control unit storing LED characteristic data curve reflecting a changing relationship between the working voltage of the LED module and the time, the reference voltage adjusting unit increasing the outputting reference voltage when the control unit judges that change range of the working voltage of the LED module exceeding a predetermined value according to the LED characteristic data curve.

2. The over-voltage and over-current protection circuit according to claim 1, wherein said LED driving unit comprises an over-voltage detecting end, an over-current detecting end and a reference voltage input end, the over-voltage detecting end obtains the over-voltage detecting voltage, the over-current detecting end obtains the over-current detecting voltage, and the reference voltage input end receives the reference voltage, the reference voltage adjusting unit comprises a voltage input end, a voltage output end and a controlled end, the voltage input end is connected to a voltage terminal, the voltage output end is connected to the reference voltage input end of the LED driving unit to output the reference voltage to the reference voltage input end of the LED driving unit, the control unit comprises a control end being connected to the controlled end of the reference voltage adjusting unit.

3. The over-voltage and over-current protection circuit according to claim 2, wherein said control unit obtains an initial value of the working voltage in the LED characteristic data curve in the beginning and a voltage corresponding to time in the LED characteristic data curve according to working time of the LED module, if change range of the voltage corresponding to the current time relating to the initial value of the working voltage is greater than a predetermined value, the control unit outputs via the control output end a boost control signal to the controlled end of the reference voltage adjusting unit and controls the reference voltage adjusting unit increasing the reference voltage output at the voltage output end.

4. The over-voltage and over-current protection circuit according to claim 2, wherein said over-voltage detection unit comprises a first resistor and a second resistor being connected in series between the positive input end of the LED module and the grand, voltage of a connecting node of the first resistor and the second resistor is the over-voltage detection voltage, which is obtained by connecting the over-voltage detecting end to the connecting node, the over-current detection unit comprises a third resistor being electrically connected between the output end of the power source and the grand, the voltage of a far end of the third resistor is the over-current detection voltage, which is proportional to the current of the third resistor.

5. The over-voltage and over-current protection circuit according to claim 4, wherein said reference voltage adjusting unit comprises a first NMOS transistor, a second NMOS transistor and a fourth resistor, a fifth resistor, a sixth resistor and a seventh resistor; the fourth resistor and the fifth resistor are connected in series between the voltage input end and the grand, a connecting node of the fourth resistor and the fifth resistor forms the voltage output end; a source of the first NMOS transistor is connected to the grand via the sixth resistor, and a drain is connected with the fourth resistor and the fifth resistor; a gate of the second NMOS transistor forms the controlled end, a source of the second NMOS transistor is connected to the grand, and its drain is connected to the gate of the first NMOS transistor and the voltage input end via the seventh resistor.

6. The over-voltage and over-current protection circuit according to claim 1, wherein said wherein said LED module further comprises a LED string being connected in parallel between the positive input end and the grand, and each LED string comprises a plurality of LED lights being connected in series with the positive input end and the grand.

7. The over-voltage and over-current protection circuit according to claim 6, wherein said LED characteristic data curve is previously obtained according to the characteristics of the LED string of the LED module.

8. A electronic device, comprising a power source, a LED module and a over-voltage and over-current protection circuit, the power source supplying the LED module, and the LED module comprising a positive end, the power source comprising a output end, wherein the over-voltage and over-current protection circuit comprising:
an over-voltage detection unit being connected between the positive input and ground to detect the voltage of the positive input end of the LED module to generate an over-voltage detection voltage being proportional to the positive input voltage;
an over-current detection unit being connected between the output end of the power source and the ground to detect the current of the LED module to generate an over-current detection voltage being proportional to the positive input current;
a LED driving unit being connected with the over-voltage detection unit and the over-current detection unit to converter a reference voltage into an over-voltage reference voltage and an over-current reference voltage being proportional to the reference voltage, the LED driving unit comparing respectively the over-voltage reference voltage and the over-current reference voltage to the over-voltage detection voltage to decide whether to perform an over-current or over-voltage protection;
a reference voltage adjusting unit outputting the reference voltage to the LED driving unit; and a control unit storing LED characteristic data curve reflecting a changing relationship between the working voltage of the LED module and the time, the reference voltage adjusting unit increasing the outputting reference voltage when the control unit judges that change range of the working voltage of the LED module exceeding a predetermined value according to the LED characteristic data curve.

9. The electronic device according to claim 8, wherein said LED driving unit comprises an over-voltage detecting end, a over-current detecting end and a reference voltage input end, the over-voltage detecting end obtains the over-voltage detecting voltage, the over-current detecting end obtains the over-current detecting voltage, and the reference voltage input end receives the reference voltage, the reference voltage adjusting unit comprises a voltage input end, a voltage output end and a controlled end, the voltage input end is connected to a voltage terminal, the voltage output end is connected to the reference voltage input end of the LED driving unit to output the reference voltage to the reference voltage input end of the LED driving unit, the control unit comprises a control end being connected to the controlled end of the reference voltage adjusting unit.

10. The electronic device according to claim 9, wherein said control unit obtains an initial value of the working voltage in the LED characteristic data curve in the beginning and a voltage corresponding to time in the LED characteristic data curve according to working time of the LED module, if change range of the voltage corresponding to the current time relating to the initial value of the working voltage is greater than a predetermined value, the control unit outputs via the control output end a boost control signal to the controlled end of the reference voltage adjusting unit and controls the reference voltage adjusting unit increasing the reference voltage output at the voltage output end.

11. The electronic device according to claim 9, wherein said over-voltage detection unit comprises a first resistor and a second resistor being connected in series between the positive input end of the LED module and the grand, voltage of a connecting node of the first resistor and the second resistor is the over-voltage detection voltage, which is obtained by connecting the over-voltage detecting end to the connecting node; the over-current detection unit comprises a third resistor being electrically connected between the output end of the power source and the grand, the voltage of a far end of the third resistor is the over-current detection voltage, which is proportional to the current of the third resistor.

12. The electronic device according to claim 11, wherein said reference voltage adjusting unit comprises a first NMOS transistor, a second NMOS transistor and a fourth resistor, a fifth resistor, a sixth resistor and a seventh resistor; the fourth resistor and the fifth resistor are connected in series between the voltage input end and the grand, a connecting node of the fourth resistor and the fifth resistor forms the voltage output end; a source of the first NMOS transistor is connected to the grand via the sixth resistor, and a drain is connected with the fourth resistor and the fifth resistor; a gate of the second NMOS transistor forms the controlled end, a source of the second NMOS transistor is connected to the grand, and its drain is connected to the gate of the first NMOS transistor and the voltage input end via the seventh resistor.

13. The electronic device according to claim 8, wherein said LED module further comprises a LED string being connected in parallel between the positive input end and the grand, and each LED string comprises a plurality of LED lights being connected in series with the positive input end and the grand.

14. The electronic device according to claim 8, wherein said LED characteristic data curve is previously obtained according to the characteristics of the LED string of the LED module.

15. The electronic device according to claim 8, wherein said electronic device is selected among LCD TVs, monitors, mobile phones, tablet PCs and laptops.

* * * * *